United States Patent
Gejima

(10) Patent No.: US 8,852,364 B2
(45) Date of Patent: Oct. 7, 2014

(54) ALUMINUM ALLOY AND HIGH STRENGTH BOLT MADE OF ALUMINUM ALLOY

(75) Inventor: Fumihiko Gejima, Komae (JP)

(73) Assignee: Nissan Motor Co., Ltd., Yokohama (JP)

( * ) Notice: Subject to any disclaimer, the term of this patent is extended or adjusted under 35 U.S.C. 154(b) by 166 days.

(21) Appl. No.: 13/393,783

(22) PCT Filed: Dec. 14, 2010

(86) PCT No.: PCT/JP2010/072421
§ 371 (c)(1),
(2), (4) Date: Mar. 1, 2012

(87) PCT Pub. No.: WO2011/114591
PCT Pub. Date: Sep. 22, 2011

(65) Prior Publication Data
US 2012/0156089 A1    Jun. 21, 2012

(30) Foreign Application Priority Data
Mar. 15, 2010    (JP) .................................. 2010-057044

(51) Int. Cl.
*C22C 21/08*    (2006.01)

(52) U.S. Cl.
USPC ............................ 148/418; 420/532; 420/535

(58) Field of Classification Search
USPC .................................. 148/418; 420/535, 532
See application file for complete search history.

(56) References Cited

U.S. PATENT DOCUMENTS

| | | | |
|---|---|---|---|
| 5,858,134 A | 1/1999 | Bechet | |
| 6,994,760 B2 * | 2/2006 | Benedictus et al. | ......... 148/552 |
| 2004/0062946 A1 | 4/2004 | Benedictus | |
| 2006/0070686 A1 * | 4/2006 | Moritz et al. | ................. 148/552 |

FOREIGN PATENT DOCUMENTS

| | | | |
|---|---|---|---|
| CN | 1662670 A | | 8/2005 |
| CN | 101386940 A | | 3/2009 |
| EP | 173632 A | * | 3/1986 |
| EP | 0173632 A1 | | 3/1986 |
| JP | 01-162754 | | 6/1989 |
| JP | 3939414 | | 6/1999 |
| JP | 11-189837 | | 7/1999 |
| JP | 2004-043907 | | 2/2004 |
| JP | 2004-149907 | | 5/2004 |

(Continued)

OTHER PUBLICATIONS

J. A. Taylor, Metal-related Castability Effects in Aluminium Foundry Alloys, vol. 8, No. 4, pp. 225-252, 1995, Cast Metals.
Technical Datasheet: AA6056, pp. 1-2, Jun. 2008, Alcan Global Aerospace, Transportation and Industry, Switzerland.

(Continued)

Primary Examiner — Roy King
Assistant Examiner — Janelle Morillo
(74) Attorney, Agent, or Firm — Global IP Counselors, LLP

(57) ABSTRACT

Provided is material for an aluminum alloy exhibiting a sufficient heat resistance, tensile strength as well as stress corrosion cracking resistance necessary for use as automobile parts. Also, provided are a forged part forged from such aluminum alloy and an aluminum alloy high strength bolt made thereof. The aluminum alloy (by mass) is consisted of (by mass) 1.0 to 1.7% of Si, 0.05 to 0.5% of Fe, 0.8 to 1.5% of Cu, 0.6 to 1.2% of Mn, 0.9 to 1.5% of Mg, 0.05 to 0.5% of Zn, 0.05 to 0.3% of Zr, 0.01 to 0.2% of V, and when needed, Ti exceeding 0% and not more than 0.05%, and, when further needed, Ni exceeding 0% and not more than 0.7%, the remainder being Al and unavoidable impurities.

9 Claims, 3 Drawing Sheets

(56) References Cited

FOREIGN PATENT DOCUMENTS

| | | |
|---|---|---|
| JP | 2009-024225 | 2/2009 |
| JP | 2010-189750 | 9/2010 |
| WO | WO 2006037647 | 4/2006 |

OTHER PUBLICATIONS

John Grandfield and John A. Taylor, The Impact of Rising Ni and V Impurity Levels in Smelter Grade Aluminium and Potential Control Strategies, pp. 129-136, Oct. 8, 2009, Trans Tech Publications, Switzerland.

\* cited by examiner

ALUMINUM ALLOY AND HIGH STRENGTH BOLT MADE OF ALUMINUM ALLOY

CROSS-REFERENCE TO RELATED APPLICATIONS

This application is a U.S. National stage application of International Application No. PCT/JP2010/072421, filed Dec. 14, 2010, which claims priority claims priority under 35 U.S.C. §119(a) to Japanese Patent Application No. 2010-057044, filed in Japan on Mar. 15, 2010, the entire contents of which is hereby incorporated by reference.

BACKGROUND

1. Field of the Invention

The present invention generally relates to an aluminum alloy used as a material for high strength parts. The present invention also pertains to various members or parts made of such an alloy as, for example, forged parts, fastening parts, in particular to aluminum alloy based high strength bolts of high strength above 450 Mpa.

2. Background Information

In recent years, due to an increasing need for improving fuel efficiency of automobiles, a reduction in weight of parts is required to improve fuel efficiency. As a concrete measure of lightweight, it is effective to replace steel parts by light alloy such as aluminum alloy or magnesium alloy. For example, when an automotive engine or transmission case should be constructed by using a magnesium alloy to achieve lightweight, it is desirable to change fastening parts (bolts, for example) made of steel for their fastening for aluminum alloy based parts in view of prevention of electrolytic corrosion and weight reduction.

As the fasteners made of aluminum alloy such as these, a high strength aluminum alloy screw is known which is made of forged material of 6000 series aluminum alloy (Al—Mg—Si base), (see e.g., Japanese Patent No. 3,939,414).

SUMMARY

However, screws made up of the 6000 series aluminum alloy, such as those disclosed in Japanese Patent No. 3,939,414, require additional measures such as using a larger sized bolt or increasing the number of fastening part, since the tensile strength is about in the order of 400 MPa at room temperature and anti-heat strength is lower compared to a steel bolt. Meanwhile, when the existing 7000 series aluminum alloy (Al—Zn type) would be used to produce bolts, although the room temperature strength more than 500 Mpa may be obtained, the heat resistance is lower than that of the 6000 series alloy. In addition, because of high susceptibility to stress corrosion cracking, additional measures will be required such as to anodize surface of the parts, which brings about a problem of increasing costs.

The aluminum alloy of the present disclosure has been made by focusing on the above problems in a conventional aluminum alloy material represented by fasteners such as bolts. One object of the present disclosure is to provide an aluminum alloy for obtaining properties as sufficient heat resistance, tensile strength, and stress corrosion cracking resistance sufficient for use as automotive parts. In addition, it is purported to provide various members of this type consisting of aluminum alloy, for example, forged parts made by forging the above alloy or a high strength aluminum alloy bolts.

In an aim to achieve the above object, extensive studies were conducted regarding alloy compositions and method of heat treatments. The aluminum alloy of the present disclosure is accomplished by confirming the objective being met by specifying the scope of the contents of alloying elements such as Si, Fe, Mn, Zr, and V in specific ranges, respectively.

The aluminum alloy of the present disclosure has been made based on the above findings. The aluminum alloy is characterized in a composition, by mass, 1.0 to 1.7% Si, 0.05 to 0.5% Fe, 0.8 to 1.5% Cu, 0.6 to 1.2% Mn, 0.9 to 1.5% Mg, 0.05 to 0.5% Zn, 0.05 to 0.3% Zr, and 0.01 to 0.2% V, respectively, and more than 0 and less than 0.05% Ti, if necessary, and more than 0 and 0.7% Ni, for further necessity, and the remainder or balance Al and inevitable impurities.

In addition, forged parts and high strength bolts made of aluminum alloy according to the present inventions are characterized by being composed of the above aluminum alloy, and further characterized in that the above mentioned bolt has a tensile strength more than 450 MPa.

According to the aluminum alloy of the present disclosure, as the component elements of aluminum alloy, in particular, Si, Fe, Mn, Zr, and V are respectively added within respective, particular ranges and by applying an appropriate heat treatment, the aluminum alloy forged parts and high strength bolts may be obtained with excellent properties such as in heat resistance, tensile strength and stress corrosion cracking resistance.

BRIEF DESCRIPTION OF THE DRAWINGS

Referring now to the attached drawings which form a part of this original disclosure.

DETAILED DESCRIPTION OF THE EMBODIMENTS

Figures 1A, 1B:
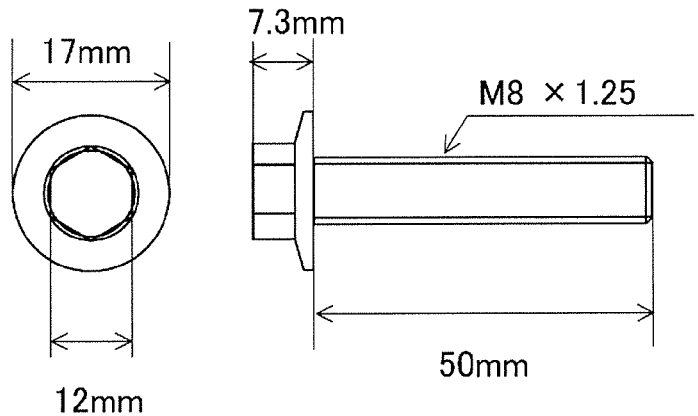
FIGS. 1A and 1B depict explanatory diagrams showing the shape and size of a bolt used to evaluate the performance of an aluminum alloy according to one embodiment.

Hereinafter, the aluminum alloy and parts consisting of such an aluminum alloy are explained in detail together with the effects of alloy contents and reason for their limitation. In this description, "%" shall represent the percentage by weight or mass unless otherwise indicated.

The component elements of the aluminum alloy can include silicon (Si), iron (Fe), copper (Cu), manganese (Mn), magnesium (Mg), zinc (Zn), zirconium (Zr) and vanadium (V). Other component elements of the aluminum alloy can include titanium (Ti) and nickel (Ni).

(1) Content of Si: 1.0 to 1.7%

Si (silicon) is one of major elements of the aluminum alloy in the present invention, along with Cu and Mg, which contributes to the improvement in strength at room temperature. Although $Mg_2Si$ precipitates by artificial aging and alloy strength will be improved, when its content exceeds 1.7%, the stress corrosion cracking resistance and corrosion resistance may exacerbate. In contrast, at less than 1.0% of Si content, such features cannot be demonstrated and lack of strength of aluminum alloy occurs.

(2) Content of Fe: 0.05 to 0.5%

Fe (iron) is a component that forms a compound with Mn, Al, and Ni etc. to improve heat resistance and machinability. At less than 0.05% content of Fe, no improvement is attained, and poor heat resistance will be exhibited. Meanwhile, if excessively added more than 0.5%, corrosion resistance may be deteriorated. In addition, coarse inclusions may be produced which have a negative impact on the tensile properties and machinability of aluminum alloy involved.

(3) Content of Cu: 0.8 to 1.5%

Cu (copper) is an element and, together with Si and Mg, contributes to the improvement in a room temperature strength. However, at its content less than 0.8%, no effect of the addition is available and insufficient strength of the aluminum alloy be appreciated. Conversely, when exceeding 1.5%, the alloy would be more likely to burn during solution treatment and the corrosion resistance of alloys will deteriorate with a poor forgibility.

(4) Content of Mn: 0.6 to 1.2%

Mn (manganese) is an element that contributes to solid solution strengthening. In addition, Mn forms a compound with other elements such as Fe (to form for example Al—Fe—Mn—Si type), with an improved heat resistance and machinability. In addition, Mn has the effect of improving the seizure resistance with dies during forging. When the added amount of Mn is less than 0.6%, such an effect is not exerted, and not only not the desired strength is available, but seizure with dies is likely to occur during forging. On the other hand, when the added amount exceeds 1.2%, coarse inclusions (such as $MnAl_6$) would be generated, and tensile properties (elongation property, in particular) and workability/machinabilty are adversely affected.

(5) Content of Mg: 0.9 to 1.5%

Mg (magnesium) is an element that, in combination with Si and Cu, contributes to improve a room temperature strength. However, at less than 0.9%, the effect of the addition cannot be obtained with insufficient strength. Meanwhile, at more than 1.5%, much of the coarse precipitates will produce which do not contribute to improving the strength, stress relaxation property, corrosion resistance and workability are deteriorated.

(6) Content Zn: 0.05 to 0.5%

Zn (zinc) is an element which contributes to the strengthening of the alloy through precipitation of Al—Mg—Zn based particles during aging. Also, it improves surface treatment properties such as for plating, however, when added in excess, in addition to corrosion resistance decrease strength might be impaired, so that Zn needs to be within the range between 0.05% and 0.5%.

(7) Content Zr: 0.05 to 0.3%

Zr (zirconium) is effective and prevents coarsening of crystal grains during heat treatment. Moreover, Zr has a stabilizing effect of grain size. However, at the addition amount less than 0.05%, the effect of preventing coarsening is not fully demonstrated, and the tensile properties and stress corrosion cracking resistance worsen due to the grain coarsening. On the other hand, when the added amount of Zr exceeds 0.3%, coarse inclusions grow and machinability/workability and tensile properties deteriorate.

(8) Content of V: 0.01 to 0.2%

V (vanadium) improves the heat resistance by forming compounds with element such as Al. Moreover, V shows the advantage of fewer adverse effects on stress corrosion cracking resistance due to its addition. When the added amount of V is less than 0.01%, the effect of improving heat resistance might not be enough. Conversely, when the addition amount of V exceeds 0.2%, because of the formation of coarse inclusions, corrosion resistance, castability, and machinability/workability deteriorate.

(9) Content of Ti: more than 0% and less than or equal to 0.05%

Ti (titanium) is an effective element, as Zr is the case, for preventing the coarsening of the grains. Therefore, Ti may be added as an optional component as needed for the same purpose as Zr. However, an excessive addition of Ti may deteriorate machinability/workability and tensile properties, the amount should be in the range of equal to or less than 0.05% as the addition. In order to obtain sufficient grain refining effect, addition of 0.01% or more of Ti is desirable.

(10) Content of Ni: More than 0% and 0.7% or Less

Ni (nickel) is an element, by forming a compound with other elements such as Al, Fe, etc. to improve heat resistance and is therefore regarded as an optional component that can be added as needed for such purposes. However, an excessive addition of more than 0.7% of Ni may lead to a production of coarse inclusions, and may have an adverse effect on stress corrosion cracking resistance, tensile properties, and machinability. Thus, the addition of Ni must be kept below 0.7%. Also, to be effective enough to enhance the heat resistance, addition of preferably 0.01% or more of Ni is desirable.

The heat treatment method of the aluminum alloy according to the present invention is not particularly limited. However, for example, T6 treatment (solution→artificial aging treatment), T8 treatment (solution→machining→artificial aging treatment), T9 treatment (solution→artificial aging→cold machining/processing) can be employed resulting in a part with tensile strength above 450 Mpa, excellent heat resistance properties, tensile resistance property, stress relaxation resistance property, and stress corrosion cracking resistance property. Also, in addition, when the heat treatment includes a heat treatment including an artificial aging processing such as T5 treatment or T7 treatment and T10 treatment which are well known as a heat treatment for aluminum alloy and includes an artificial aging treatment, a high strength part may be available by appropriately selecting the conditions of heat treatment as well as marching/processing.

The aluminum alloy disclosed herein can be used, for example, for various raw material for rolling plates or extrusion profiles. In addition, as forged parts, forged parts for automobiles, for example, such as suspension members and other body parts, various type of engine and transmission brackets, fastening bolts for engine oil pan or a variety of cases or covers, fastening bolts, screws and nuts for use in transmission, cases for electric vehicle and hybrid vehicle, the present aluminum alloy may be preferably applied. Regarding a forging method or process to obtain forged parts according to the present invention, no specific restriction is present but a hot forging performed within a range of 400 to 500° C., for example, or a cold forging such as bolt header processing may be included.

These components may be manufactured by conventional methods, and by applying the heat treatment as described above, sufficient heat resistance for automotive parts, good tensile properties and stress corrosion cracking resistance may be obtained to contribute to weight reduction. In addition, these parts show high force relaxation resistance characteristics, they are suitably used for parts of engine, transmission, motor, etc. for automotive use, which are placed in a hot environment. In particular, if adopted to a magnesium alloy casing for engine or transmission, use of the high strength aluminum alloy bolts according to the present invention is effective in preventing electrolytic corrosion as well as reducing the number of fastening bolts than a situation in which a conventional aluminum based bolt.

Figure 4:
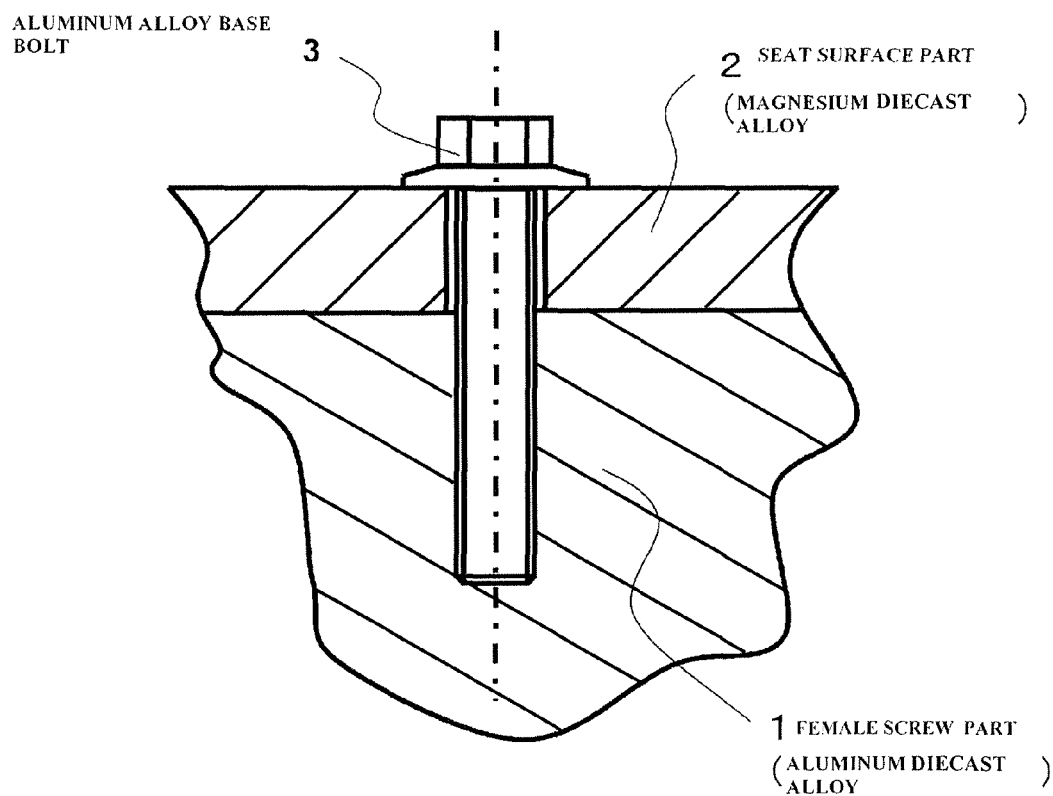
FIG. 4 depicts a schematic explanatory view showing an example of application of the forged part (e.g., the bolt) according to one embodiment.

FIG. 4 is a schematic diagram illustrating an embodiment of the forged part according to the present invention. Reference numeral 1 denotes a female threaded part or portion for oil pan mounting provided in an aluminum alloy (for example, ADC12) based cylinder block of an automotive engine. Reference numeral 2 denotes a seat surface part or portion provided in an oil pan made of heat-resistant magnesium alloy (for example, MRI153 or AE44 alloys). In the present embodiment, the aluminum alloy bolt 3, as the forged product according to the present invention, is inserted through the seat surface part 2 of the oil pan, and is subsequently screwed into a female threaded part 1 of the cylinder block. In this way, the oil pan and cylinder block are fastened This aluminum alloy bolt 3 is made of aluminum alloy of the invention, and has been subjected to the aforementioned heat treatment/process, typically, T6 treatment (solution→artificial aging), T8 treatment (Solution→Machining→artificial aging), or T9 treatment (solution→artificial aging→cold machining).

In this embodiment, since the aluminum alloy bolt 3 ensures a sufficient heat resistance, tensile properties, and stress corrosion cracking resistance, it can contribute to weight reduction of the engine. Moreover, even in high temperature environment of the engine oil pan, it can show a good stress relaxation characteristic. Still further, in addition to prevention of electrolytic corrosion, the number of fastening bolts may be decreased than when using conventional aluminum, and increase in bolt size may be avoided. Incidentally, this embodiment does not pose specific limitations. For example, both the seat surface part 2, the female threaded part 1 may be constructed by magnesium alloy, and the portion subjected to small temperature rise may use a conventional magnesium alloy such as AZ91D.

Embodiments

Although the present invention will be described in more detail based on the embodiments, the present invention should not be limited to these embodiments.

(1) Drawability—After the aluminum alloy having the composition shown in Table 1 has been melted in an electric furnace and then cast into billets of diameter 155 mm, the ingot obtained has been subjected to homogenization at the temperature of 540° C. for 4 hrs. Next, extrusions were made at 450 to 500° C., to obtain a round bar of diameter 13 mm for evaluation of drawability of each rod obtained.

TABLE 1

| ALLOY No. | | Si | Fe | Cu | Mn | Mg | Zn | Zr | V | Ti | Ni | Al |
|---|---|---|---|---|---|---|---|---|---|---|---|---|
| EMBODIMENTS | 1 | 1.10 | 0.16 | 1.06 | 0.90 | 1.10 | 0.15 | 0.10 | 0.10 | 0.02 | | REMAINDER |
| | 2 | 1.40 | 0.17 | 1.10 | 0.89 | 1.27 | 0.14 | 0.16 | 0.09 | 0.02 | | REMAINDER |
| | 3 | 1.65 | 0.17 | 1.05 | 0.90 | 1.22 | 0.15 | 0.15 | 0.11 | 0.03 | | REMAINDER |
| | 4 | 1.37 | 0.08 | 1.02 | 0.86 | 1.22 | 0.14 | 0.06 | 0.10 | 0.03 | | REMAINDER |
| | 5 | 1.36 | 0.48 | 1.04 | 0.96 | 1.32 | 0.14 | 0.16 | 0.10 | 0.02 | 0.49 | REMAINDER |
| | 6 | 1.40 | 0.17 | 0.9 | 0.92 | 1.30 | 0.15 | 0.16 | 0.10 | 0.03 | | REMAINDER |
| | 7 | 1.38 | 0.17 | 1.45 | 0.83 | 1.25 | 0.15 | 0.16 | 0.10 | 0.02 | | REMAINDER |
| | 8 | 1.36 | 0.16 | 1.10 | 0.65 | 1.28 | 0.14 | 0.15 | 0.10 | 0.03 | | REMAINDER |
| | 9 | 1.36 | 0.18 | 1.09 | 1.10 | 1.31 | 0.14 | 0.16 | 0.10 | 0.03 | | REMAINDER |
| | 10 | 1.40 | 0.17 | 1.08 | 0.92 | 0.91 | 0.15 | 0.15 | 0.09 | 0.02 | | REMAINDER |
| | 11 | 1.37 | 0.16 | 1.03 | 0.88 | 1.22 | 0.10 | 0.15 | 0.10 | 0.03 | | REMAINDER |
| | 12 | 1.39 | 0.17 | 1.05 | 0.91 | 1.30 | 0.14 | 0.25 | 0.09 | 0.03 | | REMAINDER |
| | 13 | 1.37 | 0.17 | 1.04 | 0.91 | 1.27 | 0.15 | 0.14 | 0.11 | | | REMAINDER |
| | 14 | 1.20 | 0.15 | 0.94 | 1.02 | 1.45 | 0.40 | 0.20 | 0.09 | 0.02 | | REMAINDER |
| | 15 | 1.10 | 0.15 | 1.10 | 0.70 | 1.22 | 0.15 | 0.14 | 0.02 | 0.02 | | REMAINDER |
| | 16 | 1.20 | 0.17 | 1.03 | 0.62 | 1.38 | 0.15 | 0.16 | 0.16 | 0.02 | | REMAINDER |
| | 17 | 1.31 | 0.15 | 1.13 | 0.63 | 1.25 | 0.15 | 0.13 | 0.03 | 0.02 | 0.01 | REMAINDER |
| | 18 | 1.25 | 0.12 | 1.21 | 0.81 | 1.10 | 0.14 | 0.03 | 0.02 | 0.65 | REMAINDER |
| COMPARATIVE EXAMPLES | 19 | 0.91 | 0.17 | 0.67 | 0.59 | 0.91 | 0.15 | 0.16 | | 0.02 | | REMAINDER |
| | 20 | 1.80 | 0.17 | 1.09 | 0.90 | 1.25 | 0.15 | 0.15 | 0.10 | 0.02 | | REMAINDER |
| | 21 | 1.35 | 0.95 | 1.06 | 0.95 | 1.30 | 0.15 | 0.16 | | 0.02 | 1.14 | REMAINDER |
| | 22 | 1.42 | 0.17 | 1.8 | 0.87 | 1.28 | 0.14 | 0.15 | | 0.02 | | REMAINDER |
| | 23 | 1.35 | 0.02 | 1.06 | 0.50 | 1.23 | 0.15 | 0.15 | 0.11 | 0.02 | | REMAINDER |
| | 24 | 1.37 | 0.17 | 1.05 | 1.45 | 1.21 | 0.14 | 0.16 | 0.09 | 0.02 | | REMAINDER |
| | 25 | 1.10 | 0.17 | 1.01 | 0.90 | 0.80 | 0.15 | 0.16 | 0.09 | 0.02 | | REMAINDER |
| | 26 | 1.40 | 0.17 | 1.05 | 0.91 | 1.60 | 0.15 | 0.15 | 0.10 | 0.02 | | REMAINDER |
| | 27 | 1.36 | 0.18 | 1.05 | 0.91 | 1.27 | 0.62 | 0.16 | 0.11 | 0.02 | | REMAINDER |
| | 28 | 1.38 | 0.16 | 1.1 | 0.90 | 1.29 | 0.15 | 0.04 | 0.10 | 0.03 | | REMAINDER |
| | 29 | 1.36 | 0.17 | 1.07 | 0.94 | 1.33 | 0.15 | 0.40 | 0.08 | 0.02 | | REMAINDER |
| | 30 | 1.36 | 0.16 | 1.05 | 0.95 | 1.26 | 0.14 | 0.16 | 0.005 | 0.02 | | REMAINDER |
| | 31 | 1.38 | 0.17 | 1.09 | 0.95 | 1.53 | 0.14 | 0.15 | 0.23 | 0.02 | | REMAINDER |
| | 32 | 1.40 | 0.17 | 1.07 | 0.89 | 1.24 | 0.14 | 0.15 | 0.10 | 0.10 | | REMAINDER |
| | 33 | 1.35 | 0.13 | 0.85 | 0.92 | 0.95 | 0.03 | 0.15 | 0.10 | 0.02 | | REMAINDER |

The 13 mm diameter round bars thus obtained by extrusion were annealed at 350 to 400° C. for 3 hours, and a drawing process is subsequently performed until the diameter is reduced to 9 mm for investigation for the presence of a disconnection. The test results are summarized in Table 2, in which, what have been evaluated without disconnection are indicated "○", while the bars on which a disconnection were detected during a drawing process up to 9 mm diameter are indicated "x", respectively. As a result, in Embodiments 1 to 18, no disconnection were determined, whereas the aluminum alloys whose Si, Mg, V, and Ti contents exceed respective upper limits, i.e., comparative example alloys 20, 31, and 32 produced a disconnection and these alloys have been confirmed with poor drawability.

(2) Tensile performance—After the 13 mm diameter rods obtained above have been cut into a predetermined length, a solution treatment was done by holding the samples at 550° C. for 1 hour with a subsequent water-cooling, the process of artificial aging were then performed at 180° C. for 6 hours. Then, the rods are machined to a tensile specimen geometry (parallel part width of φ10 mm, gauge length of 50 mm) for conducting tensile tests to determine tensile strength, 0.2% yield strength, and elongation at break. Table 2 also shows these results.

As a result, the alloy of Comparative Example 22 with a Cu content exceeding the upper limit according to the present invention showed a significant drop in elongation. This is considered to have occurred because of the high Cu content, a liquid phase was formed at the solution treatment temperature, which is known as burning. In addition, the Comparative Samples showing the tensile strength below 450 MPa are the Comparative Example alloy 19 in which Si, Cu, and Mn contents are below the lower limits and no V is added, the Comparative Example alloy 23 in which Fe, Mn contents are below the lower limit values, the Comparative Example alloy 25 whose Mg contents falls below the lower limit, the Comparative Example alloy 27 whose Zn content exceeds an upper limit, the Comparative Example alloy 28 whose Zr content exceeds upper limit, and the Comparative Example 33 whose Zn content falls below the lower limit, respectively.

(3) Bolt Property—Out of alloys of the above Embodiments and Comparative Examples, for those alloys excluding Comparative Example alloys 20, 31, and 32 in which disconnection were determined and Comparative Example alloys 22 with poor elongation result at tensile testing, the 13 mm diameter rods obtained above through extrusion were annealed at 350 to 400° C. for 3 hours and subsequently made to a 7 mm diameter wire by a wire drawing process. At this time, the sample alloys which were broken in the middle of the drawing underwent an annealing with the same conditions again. Using a wire thus obtained, processing was carried out to manufacture bolts in accordance with the following manner.

(a) Processing property of the header bolts—After the wires obtained were cut, a header processing is made on a bolt head (M8). The bolt head has a hexagonal shape as shown in FIG. 1, the flange diameter was of 17 mm. Examined visually for the presence of cracks in the flange, evaluation was made based on criteria listed below with the results entered in Table 2.

○: No crack in flange
Δ: A slight crack in the flange is observed, but may be formable by making suitable die or lubrication adjustments
x: Cracking is observed in the flange As a result, the aluminum alloys with its Fe, Ni, Mn, Mg and Zr contents exceeding respective upper limits, i.e., Comparative Examples 21, 23, 26, and 29 and the Comparative Example 23 in which Fe and Mn contents fall below respective lower limits have been confirmed of poor processing or machining properties.

(b) stress relaxation resistance characteristics—In past castings, the alloys of Embodiments 1 to 18 show a relatively good result for the alloy and the Comparative examples 19, 25, 27, 28, 30, 33 were extruded (to 13 mm diameter), wire drawn (to 7 mm diameter), and header processed in the same manner as described above. Then, the sample alloys were subjected to a solution treatment in which the samples were water-cooled after being maintained for 1 hour at 550 r, followed by an artificial aging treatment at 180° C. for 6 hours. Finally, by giving the process rolling, as shown in FIG. 1, the bolt with 8 mm nominal diameter, and 1.25 mm pitch (M8× 1.25) was completed.

Then, using a creep tester, stress relaxation tests were performed at 150° C. The initial stress was set for 70% of the yield strength previously obtained and measurements were made of the stress retention rate or percentage after elapsed time of 100 hours. The samples are evaluated with reference to Comparative Example 30 and those exceeding the stress retention of the bolt composed of the alloy consisting of Comparative Example 30 are indicated "○", while that with well below was evaluated as "x", respectively. Consequently, as also shown in Table 2, it was confirmed that the bolts consisting of Comparative Examples 19 or 30 with V content, in particular, less than the lower limit were deteriorated in the stress relaxation resistance properties compared to the bolts consisting of other alloy.

Figures 2A, 2C:
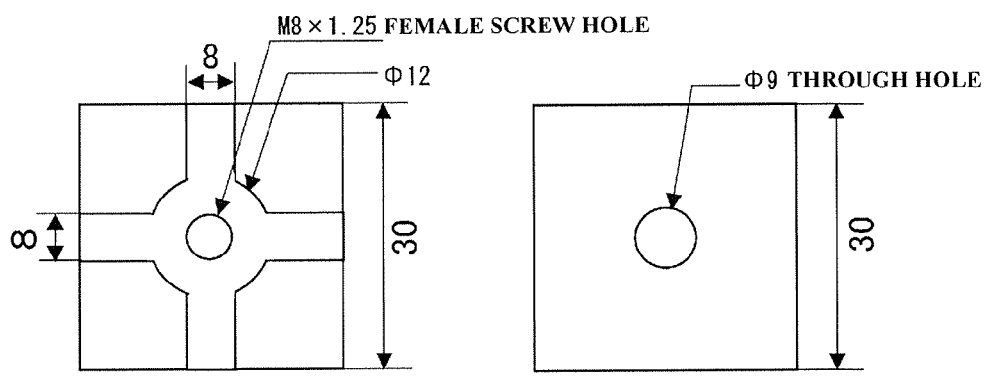
FIGS. 2A to 2D depict explanatory views showing the shape and size of a jig used in f the bolt stress corrosion cracking tests of the bolt according to one embodiment.
Figures 2B, 2D:
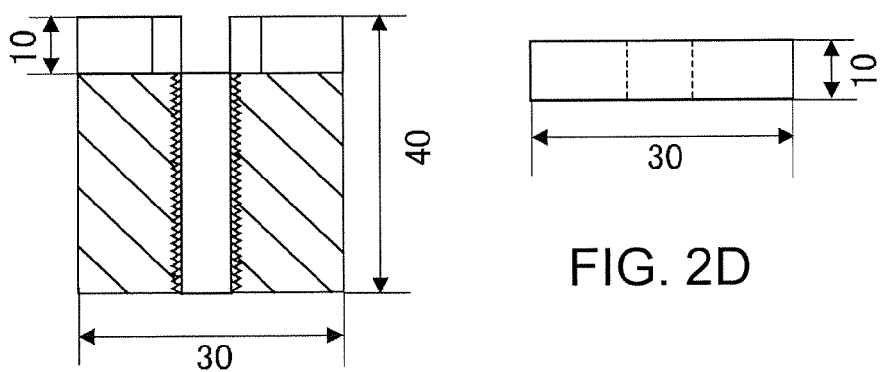
Figure 3:
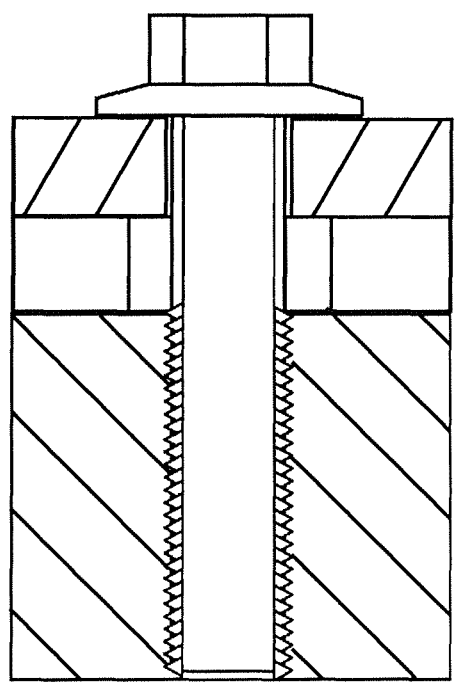
FIG. 3 depicts an explanatory diagram showing the bolt of FIGS. 1A and 1B and the jig of FIGS. 2A to 2D in a procedure for a bolt stress corrosion cracking test.

(c) Stress corrosion cracking resistance characteristics— The bolts prepared in a similar manner as those used in the above-mentioned relaxation test, were tested for a stress corrosion cracking. In other words, a jig with a female screw hole as shown in FIG. 2A is prepared, and the above mentioned bolt is fastened thereto as shown in FIG. 3 with a rectangular piece illustrated in FIGS. 2C and D having a 9 mm diameter hole interposed to reach a plastic deformation range. Then, after soaking for 10 minutes in a 10% NaCl solution, the specimen was held in air (at about 20° C., 60% relative humidity) for 24 hours after leaving, and finally check for presence of cracks during a torque check procedure was done.

If there is no crack, similar cycles (immersed for 10 minutes, allowed to stand in air for 24 hours) were repeated, and when a week has elapsed, it has been determined that, as also shown in Table 2, only the bolt consisting of the Comparative Example 30 with V content less than a lower limit exhibited cracks occurred in the lower neck, cracks were not observed in the other bolts. In addition, it should be pointed out that the jig or fixture shown in FIGS. 2A to 2D is made of A6061 series alloy (Al—Mg—Si type) which was first underwent a T6 treatment T6 (solution treatment—artificial aging treatment) and then anodized.

TABLE 2

| ALLOY No. | | DRAW-ABILITY | TENSILE PERFORMANCE | | | BOLT PROPERTY | | | OVERALL EVALUATION |
| --- | --- | --- | --- | --- | --- | --- | --- | --- | --- |
| | | | TENSILE STRENGTH (MPa) | YIELD STRENGTH (MPa) | ELON-GATION (%) | HEADER PROCESS PROPERTY | STRESS RELAXATION RESISTANCE | SCC RESIS-TANCE | |
| EMBODIMENTS | 1 | ○ | 480 | 433 | 11.2 | ○ | ○ | ○ | |
| | 2 | ○ | 516 | 493 | 10.7 | ○ | ○ | ○ | |
| | 3 | ○ | 520 | 494 | 9.5 | ○ | ○ | ○ | |
| | 4 | ○ | 490 | 464 | 10.3 | ○ | ○ | ○ | |
| | 5 | ○ | 502 | 475 | 8.8 | Δ | ○ | ○ | |
| | 6 | ○ | 483 | 459 | 11.3 | ○ | ○ | ○ | |

TABLE 2-continued

| | ALLOY No. | DRAW-ABILITY | TENSILE PERFORMANCE | | | BOLT PROPERTY | | | OVERALL EVALUATION |
|---|---|---|---|---|---|---|---|---|---|
| | | | TENSILE STRENGTH (MPa) | YIELD STRENGTH (MPa) | ELONGATION (%) | HEADER PROCESS PROPERTY | STRESS RELAXATION RESISTANCE | SCC RESISTANCE | |
| | 7 | ○ | 522 | 501 | 9.7 | Δ | ○ | ○ | |
| | 8 | ○ | 485 | 455 | 11.1 | ○ | ○ | ○ | |
| | 9 | ○ | 511 | 493 | 9.5 | ○ | ○ | ○ | |
| | 10 | ○ | 476 | 447 | 12.1 | ○ | ○ | ○ | |
| | 11 | ○ | 487 | 462 | 11.2 | ○ | ○ | ○ | |
| | 12 | ○ | 518 | 488 | 11.7 | ○ | ○ | ○ | |
| | 13 | ○ | 485 | 446 | 10.5 | ○ | ○ | ○ | |
| | 14 | ○ | 494 | 470 | 8.4 | ○ | ○ | ○ | |
| | 15 | ○ | 483 | 439 | 10.7 | ○ | ○ | ○ | |
| | 16 | ○ | 506 | 483 | 9.2 | Δ | ○ | ○ | |
| | 17 | ○ | 492 | 469 | 10.2 | ○ | ○ | ○ | |
| | 18 | ○ | 513 | 495 | 10.1 | Δ | ○ | ○ | |
| COMPARATIVE EXAMPLES | 19 | ○ | 413 | 371 | 14.6 | ○ | x | ○ | STRENGTH NG |
| | 20 | x | — | — | — | — | — | — | DRAWABILITY NG |
| | 21 | ○ | 495 | 465 | 8.4 | x | — | — | CRACK IN FLANGE |
| | 22 | ○ | 520 | — | 0 | — | — | — | BURNING AT HEAT-SOLUTION TREATMENT |
| | 23 | ○ | 430 | 398 | 12.3 | x | — | — | STRENGTH NG |
| | 24 | ○ | 479 | 451 | 6.5 | x | — | — | ELONGATION NG |
| | 25 | ○ | 394 | 356 | 13.2 | ○ | ○ | ○ | STRENGTH NG |
| | 26 | ○ | 515 | 499 | 9.4 | x | — | — | CRACK IN FLANGE |
| | 27 | ○ | 423 | 388 | 9.3 | ○ | ○ | ○ | STRENGTH NG |
| | 28 | ○ | 431 | 392 | 12.1 | ○ | ○ | ○ | STRENGTH NG |
| | 29 | ○ | 502 | 469 | 7.2 | x | — | — | CRACK IN FLANGE |
| | 30 | ○ | 496 | 469 | 10.9 | Δ | REFERENCE | x | HEAT RESISTANCE, SCC RESISTANCE NG |
| | 31 | x | — | — | — | — | — | — | DRAWABILITY NG |
| | 32 | x | — | — | — | — | — | — | DRAWABILITY NG |
| | 33 | ○ | 436 | 383 | 12.7 | ○ | ○ | ○ | STRENGTH NG |

As is apparent from the above results, all the Embodiments alloys 1 to 18 in which alloy elements or components such as Si, Fe, Mn, Zr, and V are within each specific amount are excellent both in wire-drawability and formability of bolts. Moreover, the bolts made of these alloys, when applied by an artificial aging after solution treatment, exhibit a tensile strength of over 450 Mpa or more, 0.2% stress resistance over 400 MPa, and elongation of more than 9%, and thus a good tensile property was confirmed together with an excellent stress relaxation resistance property as well as stress corrosion crack resistance property.

In contrast, in Comparative Example alloys 19 to 33, because any of the above alloy composition is outside of the above specific ranges, one or more properties are insufficient, resulting in a lower overall evaluation It should be noted that the method of manufacturing bolts in the above Embodiments is conventional, yet other methods are applicable such as T8 treatment in which a solution treatment, followed by processing (thread rolling), followed by aging treatment were done.

Further, the above embodiments, description has been made on bolts, the aluminum alloys according to the present invention is not only applicable to bolts, it can be applied, as described above, such as to rolled plates or extruded parts. Furthermore, as forged parts, suspension members, various kind of engine and transmission brackets, as well as fasteners and like including screws and nuts are suitably for use of the subject alloy of present invention.

The invention claimed is:
1. An aluminum alloy consisting essentially of:
1.0 to 1.7% of Si by mass,
0.05 to 0.5% of Fe by mass,
0.8 to 1.5% of Cu by mass,
0.6 to 1.2% of Mn by mass,
0.9 to 1.5% of Mg by mass,
0.05 to 0.5% of Zn by mass,
0.05 to 0.3% of Zr by mass, and
0.01 to 0.2% of V by mass,
the remainder being Al and unavoidable impurities.
2. An aluminum alloy consisting essentially of:
1.0 to 1.7% of Si by mass,
0.05 to 0.5% of Fe by mass,
0.8 to 1.5% of Cu by mass,
0.6 to 1.2% of Mn by mass,
0.9 to 1.5% of Mg by mass,
0.05 to 0.5% of Zn by mass,
0.05 to 0.3% of Zr by mass,
0.01 to 0.2% of V by mass, and
Ti exceeding 0% by mass and not more than 0.05% by mass,
the remainder being Al and unavoidable impurities.
3. An aluminum alloy consisting essentially of:
1.0 to 1.7% of Si by mass,
0.05 to 0.5% of Fe by mass,
0.8 to 1.5% of Cu by mass,
0.6 to 1.2% of Mn by mass,
0.9 to 1.5% of Mg by mass,
0.05 to 0.5% of Zn by mass,
0.05 to 0.3% of Zr by mass,
0.01 to 0.2% of V by mass,
Ti exceeding 0% by mass and not more than 0.05% by mass, and
Ni exceeding 0% by mass and not more than 0.7% by mass,
the remainder being Al and unavoidable impurities.
4. A forged part characterized by being made of the aluminum alloy claimed in claim 1.

5. An aluminum alloy based high strength bolt composed of the aluminum alloy claimed in claim 1, and further having a tensile strength of more than 450 MPa.

6. A forged part characterized by being made of the aluminum alloy claimed in claim 2.

7. An aluminum alloy based high strength bolt composed of the aluminum alloy claimed in claim 2 and further having a tensile strength of more than 450 MPa.

8. A forged part characterized by being made of the aluminum alloy claimed in claim 3.

9. An aluminum alloy based high strength bolt composed of the aluminum alloy claimed in claim 3, and further having a tensile strength of more than 450 MPa.

\* \* \* \* \*